United States Patent
Van Heeringen et al.

(10) Patent No.: US 7,931,731 B2
(45) Date of Patent: Apr. 26, 2011

(54) PROCESS FOR PRODUCTION OF ELEMENTAL IRON

(75) Inventors: Gijsbert Jan Van Heeringen, Amsterdam (NL); Ewout Martijn Van Jarwaarde, Amsterdam (NL); Hendrik Jan Van Der Ploeg, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/544,800

(22) Filed: Aug. 20, 2009

(65) Prior Publication Data

US 2010/0050812 A1    Mar. 4, 2010

Related U.S. Application Data

(60) Provisional application No. 61/094,219, filed on Sep. 4, 2008.

(30) Foreign Application Priority Data

Aug. 21, 2008    (EP) .................................... 08162743

(51) Int. Cl.
*C21B 3/00* (2006.01)
*B01D 53/74* (2006.01)

(52) U.S. Cl. ............................................. 75/505; 95/55

(58) Field of Classification Search .................... 75/505; 95/55

See application file for complete search history.

(56) References Cited

U.S. PATENT DOCUMENTS

| | | | |
|---|---|---|---|
| 2,740,706 A | 4/1956 | Paull et al. | 75/35 |
| 6,033,456 A * | 3/2000 | Jahnke | 75/505 |
| 6,977,007 B2 * | 12/2005 | Siadous et al. | 95/55 |
| 2003/0009943 A1 | 1/2003 | Millet et al. | 48/198.3 |
| 2009/0133535 A1 * | 5/2009 | Van Heeringen et al. | 75/392 |

FOREIGN PATENT DOCUMENTS

| | | |
|---|---|---|
| EP | 0018235 | 10/1980 |
| GB | 2261224 | 5/1993 |

* cited by examiner

*Primary Examiner* — George Wyszomierski
*Assistant Examiner* — Tima M McGuthry-Banks

(57) ABSTRACT

A process to prepare elemental iron by contacting an iron ore feed with a reducing gas at a pressure of between 1 and 10 bar to obtain iron and an off-gas includes preparing the reducing gas by performing the following steps: (a) partially oxidizing a mixture comprising a solid or liquid carbonaceous fuel and oxygen at a pressure of between 10 and 80 bar, thereby obtaining a gas comprising $H_2$ and CO; (b) removing $CO_2$ and $H_2S$ from the gas obtained in step (a) to obtain an intermediate gas comprising $H_2$ and CO; (c) supplying the intermediate gas obtained in step (b) to a $H_2$-selective membrane to obtain a $H_2$-rich permeate gas and a CO-rich retentate; and (d) heating $H_2$-rich permeate to obtain a heated $H_2$-rich permeate as the reducing gas.

20 Claims, 1 Drawing Sheet

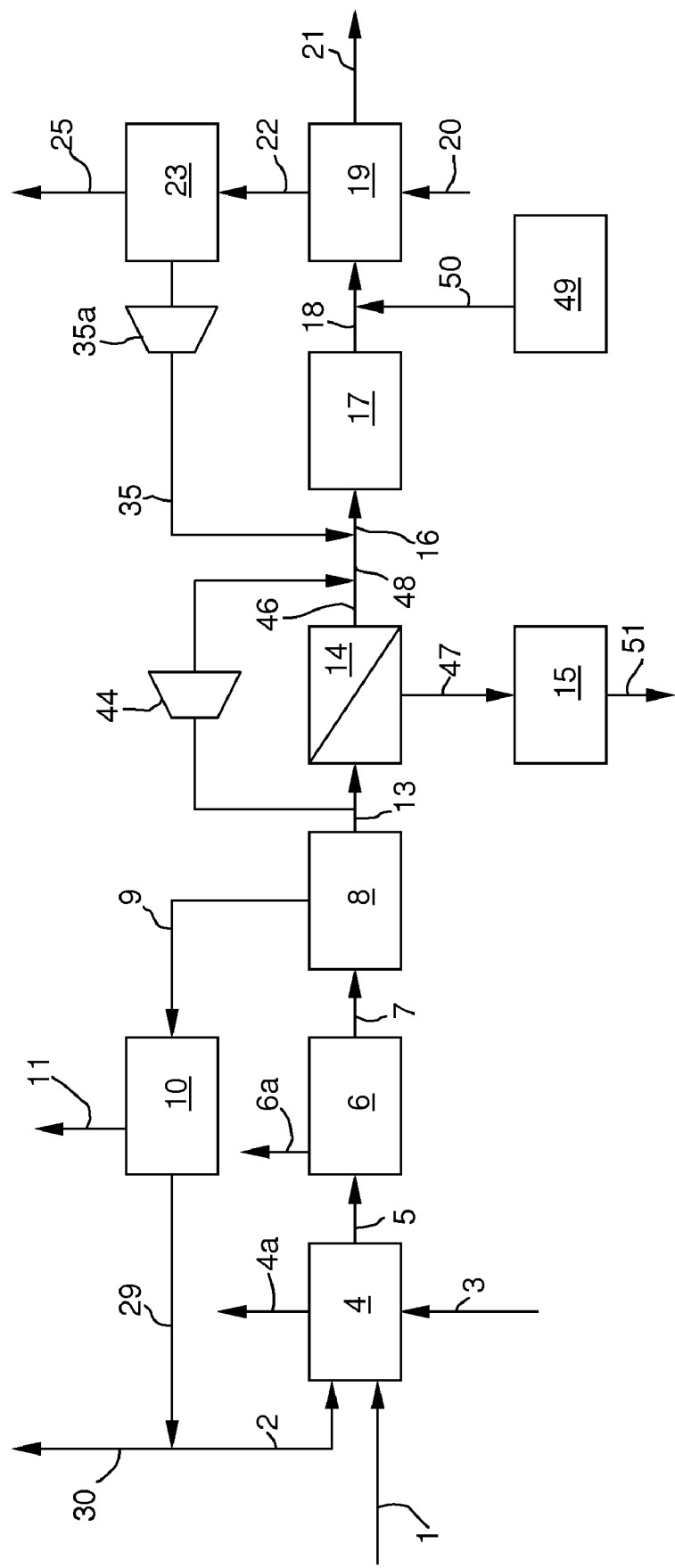

PROCESS FOR PRODUCTION OF ELEMENTAL IRON

PRIORITY CLAIM

The present application claims priority from U.S. Provisional Application 61/094,219, filed 4 Sep. 2008, and from EP Application 08162743.2, filed 21 Aug. 2008.

TECHNICAL FIELD OF THE INVENTION

The invention is directed to a process to prepare elemental iron by contacting an iron ore feed with a reducing gas comprising synthesis gas.

BACKGROUND OF THE INVENTION

Direct reduction of iron (DRI) generates metallic iron in a solid form by removing oxygen from the iron ore by using a reducing gas that can be provided from a synthesis gas. Industrially applied DRI processes include MIDREX, HyL and FINMET, as described in "Development of Reduction Process for the Steel Production" by M. Gojic and S. Kozuh, Kem. Ind. 55 (1) 1-10 (2006).

The reducing gas for the iron ore reduction is typically provided from the synthesis gas obtained from natural gas by catalytic steam methane reforming (SMR). Disadvantages of the catalytic steam reforming process include coking and carbon formation on the catalyst, as well as deactivation of a catalyst in presence of sulphur. To overcome these problems, specific and/or expensive catalysts are used as described in US-A-2005/0058594.

However, it would be advantageous to obtain a DRI process, which is originally designed to be operated with a SMR, and wherein the reducing gas is prepared from a source other than natural gas. Such a process would be advantageous because the use of SMR and the disadvantages thereof are avoided.

EP-A-0916739 describes a process wherein the reducing gas for a DRI process is obtained by gasification of a coal slurry. The reducing gas fed to the DRI includes a recycle gas stream that has exited the DRI, and wherein acid gases have been removed from the recycle gas stream.

It is an object of the present invention to provide a DRI process which can be easily obtained by adapting a DRI process involving a SMR process to prepare the reducing gas.

SUMMARY OF THE INVENTION

The above object is achieved by the present invention by the following process. Process to prepare elemental iron by contacting an iron ore feed with a reducing gas at a pressure of between 1 and 10 bar to obtain iron and an off-gas, wherein the reducing gas is prepared by performing the following steps:
(a) partially oxidizing a mixture comprising solid or liquid carbonaceous fuel and oxygen at a pressure of between 10 and 80 bar, thereby obtaining a gas comprising $H_2$ and CO;
(b) removing $CO_2$ and $H_2S$ from the gas obtained in step (a) to obtain an intermediate gas comprising $H_2$ and CO;
(c) supplying the intermediate gas obtained in step (b) to a $H_2$-selective membrane to obtain a $H_2$-rich permeate gas and a CO-rich retentate; and
(d) heating $H_2$-rich permeate to obtain a heated $H_2$-rich permeate as the reducing gas.

The present invention is also directed to a method to retrofit a process for preparing elemental iron wherein to an original process, comprising at least one furnace for contacting an iron ore with a reducing gas and a steam methane reformer for preparing the reducing gas, wherein said steam methane reformer comprises a reactor having tubes filled with catalyst and a plurality of burners to heat the exterior of the tubes, a coal gasification reactor, a membrane unit to obtain a $H_2$-rich permeate and a feed furnace to increase the temperature of the $H_2$-rich permeate to obtain a heated $H_2$-rich permeate as the reducing gas, is added, wherein the feed furnace is obtained by adapting the steam methane reforming reactor of the original process, which reactor has been adapted for use as a feed furnace by removing the catalyst from the tubes such that the $H_2$-rich permeate can flow through the tubes.

Applicants found that the process according to the invention can be easily obtained by adapting a DRI process originally designed for a SMR derived reducing gas. Another advantage is that the process of present invention generates a CO-rich retentate obtained in step (c) which can advantageously be used as a fuel in a gas turbine to generate power. An advantage of the method to retrofit is that the SMR reactor is reused in the new process.

BRIEF DESCRIPTION OF THE DRAWING

In the detailed description that follows, reference will be made to the FIGURE, which is a schematic illustration of a process scheme for a process according to the present invention.

DETAILED DESCRIPTION OF THE PREFERRED EMBODIMENTS

In the DRI process an iron ore feed is contacted with the reducing gas comprising $H_2$ and CO to obtain elemental iron and an off-gas. Exemplary DRI processes are those mentioned earlier.

In a typical DRI process the iron ore feed is usually in the form of pellets or in the lump form or a combination of the two. The iron ore is supplied to a heated DRI furnace or to a set of reactors through which it descends by gravity at superatmospheric pressure, e.g., 1.5-12 bar. Iron ore feed is reduced in the said DRI furnace or set of reactors by the action of counterflowing reducing gas that has high $H_2$ and CO contents. Process specifics of the DRI processes are described for example in "*Kirk-Othmer Encyclopedia of Chemical Technology*," fourth edition, volume 14, John Wiley & Sons, 1985, pages 855-872.

The reducing gas is used to remove oxygen from the iron oxide comprised within the iron ore feed. The reducing process can be illustrated by the following reaction, where $H_2O$ and $CO_2$ are obtained as by-products:

$Fe_2O3 + H_2 \rightarrow 2Fe + 3H_2O$

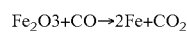

$Fe_2O3 + CO \rightarrow 2Fe + CO_2$

Preferably the reducing gas has $H_2$/CO ratio of at least 0.5. It is also preferred that the reducing gas has a "gas quality" of at least 10. The gas quality is defined as a ratio of reductants to oxidants, as demonstrated by the following equation:

$$\text{Gas quality} = (\text{mol \% } H_2 + \text{mol \% CO})/(\text{mol \% } H_2O + \text{mol \% } CO_2)$$

Iron obtained from the DRI process is cooled and carbonized by means of the counterflowing gasses in the lower portion of the shaft DRI furnace according to the following reaction:

$$3Fe + CO + H_2 \rightarrow Fe_3C + H_2O$$

$$3Fe + CH_4 \rightarrow Fe_3C + 2H_2$$

By means of this process it is possible to manufacture for example so-called cold DRI products, hot briquetted iron, or hot direct reduction iron.

The off-gas of the DRI process is spent reducing gas exiting the DRI furnace. The off-gas can be cleaned by scrubbing and $CO_2$ removal and is preferably recycled to be re-used as reducing gas. Preferably the off-gas is treated before such re-use to adjust the optimal "gas quality" as described above.

In step (a) of the process according to the invention a mixture consisting of a solid carbonaceous fuel and oxygen containing gas is partially oxidized, thereby obtaining a gas comprising $H_2$ and CO.

The partial oxidation may be performed by any process known. Preferably the partial oxidation is performed by means of the so-called entrained-flow gasification process as described in "*Gasification*" by C. Higman and M. van der Burgt, 2003, Elsevier Science, Chapter 5.3, pp. 109-128. More preferably step (a) is performed in an entrained-flow gasifier process wherein the reaction between the mixture of carbonaceous fuel and oxygen containing gas takes place in a gasification reactor provided with one or more burners. In such a process an oxygen containing gas and a solid carbonaceous fuel are supplied to a burner. Preferably the solid carbonaceous feed is provided to the burner in a gas-solids mixture comprising the solid feed in the form of a powder and a suitable carrier gas. Examples of suitable carrier gasses are nitrogen, carbon dioxide or synthesis gas, i.e. a mixture comprising CO and $H_2$. The carrier gas is preferably carbon dioxide. The use of this carrier gas is for example described in WO-A-2007042562.

$CO_2$ containing carrier medium contains preferably at least 80%, more preferably at least 95% $CO_2$. $CO_2$ may be in the liquid, gaseous or supercritical form. Preferably $CO_2$ is in the gaseous form. $CO_2$ can be separated from the gas obtained from the gasification process and from the off-gas of the DRI process. Preferably $CO_2$ as obtained in step (b) is used as the carrier medium in step (a). This is advantageous in terms of selectivity of CO and $H_2$. Furthermore by not using inert gases such as $N_2$ as carrier gas a build-up of $N_2$ in the gas recycle streams of the process according to the invention is avoided or at least significantly minimized. This allows the use of smaller equipment.

Preferably, the $CO_2$ containing carrier gas supplied in step (a) is supplied to the burner at a velocity of less than 20 m/s, preferably from 5 to 15 m/s, more preferably from 7 to 12 m/s. Further it is preferred that the $CO_2$ and the carbonaceous fuel are supplied at a density of from 300 to 600 kg/m$^3$, preferably from 350 to 500 kg/m$^3$, more preferably from 375 to 475 kg/m$^3$.

In a preferred embodiment of the process according to the present invention, the weight ratio of $CO_2$ to the carbonaceous fuel in step (a) is in the range from 0.12-0.49, preferably below 0.40, more preferably below 0.30, even more preferably below 0.20 and most preferably between 0.12-0.20 on a dry basis.

It has been found that using the relatively low weight ratio of $CO_2$ to the carbonaceous fuel in step (a) less oxygen is consumed during gasification.

One or more burners can be provided in the gasification reactor. The burner can be a single burner directed downward at the top of a vertically elongated reactor. Preferably the gasification reactor will have substantially horizontal firing burners in diametrically opposing positions. The burner is preferably a co-annular burner with a passage for an oxygen containing gas and a passage for the fuel and the carrier gas. Partial oxidation of the carbonaceous fuel occurs at a relatively high temperature in the range of 1000° C. to 2000° C. and at a pressure in a range of 10-80 bar. Preferably the pressure is between 10 and 70 bar, more preferably between 30 and 60 bar, even more preferably between 25 and 40 bar.

The gas is cooled with either direct quenching with water, direct quenching with the off-gas, direct quenching with the part of the gas obtained in either steps (a) or (b), by indirect heat exchange against evaporating water or combination of such cooling steps. Slag and other molten solids are suitably discharged from the gasification reactor at the lower end of the said reactor.

The term carbonaceous fuel may be any carbonaceous fuel in solid or liquid form. Liquid fuel may be any residue oil as obtained in the refinery operations. Examples of solid carbonaceous fuels are coal, coke from coal, petroleum coke, soot, biomass and particulate solids derived from oil shale, oil sands, tar sands and pitch. Preferably the solid carbonaceous fuel is chosen from the group of coal, petroleum coke, peat and solid biomass. Coal is particularly preferred, and may be of any type and sulphur content, including lignite, sub-bituminous, bituminous and anthracite. Coal is preferably supplied to the burner in form of fine particulates. The term fine particulates is intended to include at least pulverized particulates having a particle size distribution so that at least about 90% by weight of the material is less than 90 µm and moisture content is typically between 2 and 12% by weight, and preferably less than about 8%, more preferably less than 5% by weight. Preferably coal is supplied in admixture with $CO_2$ as a carrier medium.

The oxygen containing gas comprises substantially pure $O_2$ or air. Preferably it contains at least 90% by volume oxygen, with nitrogen, carbon dioxide and argon being permissible as impurities. Substantially pure oxygen is preferred, such as prepared by an air separation unit (ASU). Steam may be present in the oxygen containing gas as supplied to the burner to act as moderator gas. The ratio between oxygen and steam is preferably from 0 to 0.3 parts by volume of steam per part by volume of oxygen.

The gas obtained in step (a) comprises mainly $H_2$ and CO, which are the main components of the synthesis gas, and can further comprise other components such as $CO_2$, $H_2S$, HCN and COS. The gas obtained in step (a) suitably comprises from 1 to 10 mol % $CO_2$, preferably from 4.5 to 7.5 mol % $CO_2$ on a dry basis when performing the process according to the present invention. The gas obtained in step (a) is preferably subjected to a dry solids removal and wet scrubbing.

The dry solids removal unit may be of any type, including the cyclone type. The dry solid material is discharged from the dry solids removal unit to be further processed prior to disposal.

In order to remove the particulate matter, for example soot and ash particles, the gaseous stream obtained in step (a) is contacted with a scrubbing liquid in a soot scrubber. The gaseous stream exiting the gasifier is generally at elevated temperature and at elevated pressure. To avoid additional cooling and/or depressurising steps, the scrubbing step in the soot scrubber is preferably performed at elevated temperature and/or at elevated pressure. Preferably, the temperature at which the reducing gas is contacted with scrubbing liquid is in the range of from 120 to 180° C., more preferably from 130 to 150° C. Preferably, the pressure at which the gaseous stream obtained in step (a) is contacted with scrubbing liquid is in the range of from 20 to 80 bar (absolute), more preferably from 20 to 60 bar (absolute).

The process further comprises step (b) of removing $CO_2$ and $H_2S$ from the gas obtained in step (a) thereby obtaining the intermediate gas comprising $H_2$ and CO and a first stream comprising $CO_2$ and $H_2S$.

Removing $CO_2$ and $H_2S$ is performed in a, hereafter referred to, $CO_2$ recovery system. The $CO_2$ recovery system is preferably a combined $CO_2/H_2S$ removal system. Preferably $CO_2/H_2S$ removal is performed by absorption using so-called physical and/or chemical solvent process. The $CO_2$ recovery is performed on the gaseous stream obtained in step (a). The off-gas of the DRI contacting process is suitably also subjected to the same or a different $CO_2$ recovery system to obtain a recycle reducing gas comprising CO and $H_2$ and a second stream comprising $CO_2$ and possibly $H_2S$. In case the $CO_2$ recovery system is the same, the second stream and the first stream are the same and will be referred to as the first stream.

It is preferred to remove at least 80 vol %, preferably at least 90 vol %, more preferably at least 95 vol % and at most 99.5 vol %, of the $CO_2$ present in the gaseous stream obtained in step (a).

Absorption processes are characterized by washing the synthesis gas with a liquid solvent, which selectively removes the acid components (mainly $CO_2$ and $H_2S$) from the gas. The laden solvent is regenerated, releasing the acid components and recirculated to the absorber. The washing or absorption process takes place in a column, which is usually fitted with for example packing or trays. On an industrial scale there are typically two categories of absorbent solvents, depending on the mechanism to absorb the acidic components: chemical solvents and physical solvents. Reference is made to the absorption process as described in for example chapters 8.2.1 and 8.2.2 of "*Gasification*" (already referred to), pages 298-309.

Chemical solvents which have proved to be industrially useful are primary, secondary and/or tertiary alkanolamines. The most frequently used amines are derived from ethanolamine, especially monoethanol amine (MEA), diethanolamine (DEA), triethanolamine (TEA), diisopropanolamine (DIPA) and methyldiethanolamine (MDEA).

Physical solvents which have proved to be industrially suitable are cyclo-tetramethylenesulfone and its derivatives, aliphatic acid amides, N-methylpyrrolidone, N-alkylated pyrrolidones and the corresponding piperidones, methanol, ethanol and mixtures of dialkylethers of polyethylene glycols.

A well-known commercial process uses an aqueous mixture of a chemical solvent, especially DIPA and/or MDEA, and a physical solvent, especially cyclotetramethylene-sulfone also referred to as sulfolane. Such systems show good absorption capacity and good selectivity against moderate investment costs and operational costs. They perform very well at high pressures, especially between 20 and 90 bar (absolute).

Preferably the solvent comprises one or more compounds selected from the group of N-methylpyrrolidone (NMP), dimethyl ether of polyethylene glycol (DMPEG), methanol or an amine such as di-isopropanol amine (DIPA) or mixtures of amines with sulfolane. More preferably, the solvent comprises an amine and sulfolane.

Preferably step (b) comprises one or more further removal systems, for example guard or scrubbing units. These further removal systems are aimed at removing HCN and COS or other contaminants such as $NH_3$, $H_2S$, metals, carbonyls, hydrides or other trace contaminants which may be comprised in the gas obtained in step (a).

Preferably step (b) is performed by at least two steps wherein in a first step the gas obtained in step (a) is contacted with the HCN/COS hydrolysis catalyst to convert HCN to $NH_3$ and COS to $H_2S$, followed by removal of water and ammonia from the gas by cooling and/or scrubbing, and in a second step the gas obtained in said first step is contacted with a suitable solvent, which is selective for absorbing $CO_2$ and $H_2S$ as described above.

The process of contacting the gas obtained in step (a) with the HCN/COS hydrolysis catalyst to convert HCN to $NH_3$ and COS to $H_2S$ takes place by catalytic hydrolysis in a hydrolysis unit.

Examples of a suitable hydrolysis units are disclosed in WO-A-2004105922. The hydrolysis unit can be a gas/solid contactor, preferably a fixed bed reactor. Hydrolysis catalysts are known to those skilled in the art and include for example $TiO_2$-based catalysts or catalysts based on alumina and/or chromium-oxide. Preferred catalysts are $TiO_2$-based catalysts.

The $CO_2/H_2S$ removal system may further comprise step(s) of $H_2S$ removal from the first stream comprising $CO_2$ and $H_2S$ obtained in step (b). Preferably the $CO_2$ as obtained in step (b) has sulphur content lower than 10 ppmv, more preferably between 5 and 10 ppmv. $H_2S$ removal is preferably performed by means of a sulphur recovery unit, such as liquid redox type process or Claus process. More preferably it is performed by liquid redox type process by contacting the stream of $CO_2$ and $H_2S$ obtained in step (b) with an aqueous reactant solution comprising iron (III) chelate of an organic acid or complex reactant system to produce elemental sulphur which is recovered as a by-product of the present process either prior to or subsequent to regeneration of the reactant, as described in for example "*Gas Purification*" by A. Kohl and R. Nielsen, Gulf Publishing Company, fifth edition, pages 803-840.

$H_2S$ removal can also be performed on the second stream comprising $CO_2$ and $H_2S$, or on a mixture of the first and the second stream comprising CO and $H_2S$. $H_2S$ removal can be performed by any suitable means, for example by subjecting the aqueous solution containing sulphide to a sulphide-oxidising bacteria in the presence of oxygen in a reactor wherein sulphide is oxidised to elemental sulphur, as described in WO-A-9210270.

Preferably at least part of the $CO_2$ obtained in step (b) is recycled to step (a). The $CO_2$ that is recycled to step (a) to be used as a carrier is isolated from the first and optionally from the second stream comprising $CO_2$ and $H_2S$.

Excess $CO_2$ is preferably stored in subsurface reservoirs or more preferably a part of the $CO_2$ as obtained in step (c) is used for one of the processes comprising enhanced oil recovery, $CO_2$ sequestration or coal bed methane extraction. A part of the $CO_2$ can be injected into the subterranean zone such to enhance the recovery of hydrocarbon containing stream as produced from said subterranean zone.

The intermediate gas obtained in step (b) is directed to a $H_2$-selective membrane in step (c) to obtain a $H_2$-rich permeate gas and a CO-rich retentate.

The $H_2$-selective membrane may be any $H_2$-selective membrane known in the art. Preferably, the $H_2$-selective membranes have a permselectivity of $H_2$ over CO of at least 100, preferably at least 1000. Reference herein to permselectivity of a membrane is to the ratio of the permeability of $H_2$ to the permeability of CO. Examples of such membranes are microporous silica membranes, membranes comprising palladium or palladium alloys, polymeric membranes, carbon molecular sieve membranes. The membrane is preferably a polymeric membrane. More preferably it is a cross-linked polymeric membrane. Suitably the membrane is a polyimide or polyaramide based membrane. Commercially available polyimide membranes include Matrimid® obtainable by Ciba Specialty Chemicals Ltd., Switzerland, and P84 obtainable by Degussa AG, Germany.

Membranes made from blends of polyimides are also suitable for the gas phase removal of hydrogen from a hydrogen and carbon monoxide containing gas mixture and show a particularly useful selectivity between hydrogen and carbon monoxide. Such membranes are for example described in WO-A-2008046880.

In general, membranes may be dense or porous, self-supporting or membranes comprising a thin selective layer and one or more $H_2$-permeable substrate(s). Ideally membranes will combine high $H_2$ permeability and permselectivity with sufficient mechanical strength. Such membranes are known in the art, for example hydrogen selective microporous silica membranes prepared by different methods, as described in for example "Nanoporous Materials—Science and Engineering" edited by Lu, G. Q.; Zhao, X. S., page 243 (Table 1) (2004).

The $H_2$-selective membranes may have any known configuration suitable for application in the present invention. Examples of suitable membrane configurations are flat sheet, spiral wound, tubular, hollow fibre configurations. Preferably, the membranes are tubular to enable higher surface to volume ratio. The membranes may be positioned in a single membrane unit (stage) or in several units, wherein each unit may be comprised of one or more separate membranes.

Typically, the number of membranes will depend on the surface area of the separate membranes in combination with the required quantity of hydrogen to be permeated. The membrane units may comprise hydrogen separation membranes of same or different type in terms of composition or configuration. As a consequence, the membrane units may differ in for instance shape, hydrogen permeability, hydrogen permselectivity and/or surface area available for permeation.

Hydrogen is selectively transported from the gas mixture on the retentate side of the membrane, through the membrane, to the permeate side of the membrane. Hydrogen concentration in the intermediate gas supplied to the membrane in step (c) is usually greater than 10%, preferably between 20 and 40 mol %, more preferably between 25 and 35 mol %. The permeate side of the membrane is in fluid communication with an outlet for the $H_2$-rich permeate. The $H_2$-rich permeate is discharged from the permeate side of the membrane. Preferably, the temperature at which the membrane is operated is in the range of from 40 to 190° C., more preferably for a polymeric membrane between 70° C. and 110° C. For palladium membranes the temperature at which the membrane is operated is preferably at least 350° C. To provide a suitable temperature at which a membrane of a certain type is operated the feed gas entering the membrane can be preheated by any suitable means.

The process of the present invention may be carried out at any suitable pressure difference over the membrane, e.g. between 1 bar and 100 bar. Preferably the pressure difference is between 3 and 50 bar, more preferably between 5 and 25 bar, wherein the pressure of the intermediate gas supplied to a membrane is higher than the pressure at the permeate side.

The pressure at the permeate side of the membrane is usually between 0.01 and 50 bar (absolute), suitably between 0.1 and 20 bar (absolute), preferably between 0.5 and 10 bar (absolute), more preferably between 1 and 4 bar (absolute).

The pressure of the intermediate gas supplied to a membrane in step (c) is suitably between 1.01 and 250 bar (absolute), especially between 2.1 and 120 bar (absolute), preferably between 3.5 and 60 bar (absolute), more preferably between 5.5 and 29 bar (absolute).

In the process according to the invention the hydrogen rich permeate usually contains more than 50 vol % of hydrogen, suitably between 70 an 98 mol % of hydrogen, preferably between 85 and 96 mol %. The hydrogen lean retentate will usually contain less than 50 vol % of hydrogen based of the full stream, and suitably contains between 1 and 40 mol % of hydrogen, more suitably between 2 and 15 vol %.

In the process according to the invention the water is removed from the gas mixture prior to step (c), by cooling the gas below the dew point of the water, followed by removal of the condensed water. Removal of the water can be done by a simple knock out vessel.

The CO-rich retentate obtained from the $H_2$-selective membrane in step (c) is preferably used as a fuel in a gas turbine to generate power. Preferably the power generation unit is a combined cycle power generation unit. Generated power is suitably used in the process according to the invention and in any downstream processes such as in particular the use of electric arch furnace to obtain cast iron products from the elemental iron.

The $H_2$-rich permeate obtained from the $H_2$-selective membrane in step (c) is heated in step (d) to obtain a heated $H_2$-rich permeate as the reducing gas.

Preferably a part of the intermediate gas obtained in step (b) is not subjected to step (c). This part is lowered in pressure, preferably using an expander to generate power. Preferably this lower-pressure gas is mixed with the $H_2$-rich permeate and the mixture is subjected to step (d). The advantage is that in this way the $H_2/CO$ ratio of the reducing gas can be controlled by changing the ratio of gas supplied to step (c) and gas not subjected to step (c).

Preferably the heating in step (d) is performed in a furnace. More preferably this furnace is a feed furnace which is the retrofitted steam methane reforming reactor of the original process, which reactor has been adapted for use as a feed furnace by removing the catalyst from the tubes such that the $H_2$-rich permeate can flow through the tubes. In the furnace of the DRI process the reducing gas is contacted with the iron ore feed to produce iron and the off-gas. Preferably the $H_2/CO$ ratio of the reducing gas is in a range of between 0.9 and 2, and more preferably about 1.

The present invention is also directed to a process wherein the reducing gas is prepared by performing the steps (a)-(d) in a retrofitted process as obtained by the method to retrofit according to the invention.

Alternatively the steam methane reformer or an oil or gas gasifier can be maintained as a back up in case of failure of steps (a)-(c) of the process according to the present invention.

Referring now to the process scheme of FIG. 1, a solid carbonaceous fuel (1), preferably coal as fine particulates, is mixed with the $CO_2$ containing carrier gas (2) and fed to a burner of a gasification reactor (4) where it is contacted with an oxygen containing gas (3) to obtain a gas comprising $H_2$ and CO (5) and slag (4a). The gas (5) is treated in a (dry and wet) solids removal unit (6). The solid material is discharged from the (dry and wet) solids removal unit (6) via line (6a). Stream (7), free of solids, enters a $CO_2/H_2S$ removal system (8) where the removal of acid gases such as $CO_2$, $H_2S$, and any other contaminants as HCN, COS takes place. After exiting the $CO_2/H_2S$ removal system (8), the cleaned intermediate gas (13) is subjected to a H$_2$-selective membrane (14) to obtain H$_2$-rich permeate (46) and CO-rich retentate (47). CO-rich retentate (47) is used to produce power (51) in a power plant (15). The generated power can be used in the current process or in a separate process.

A part of the intermediate gas (13) not subjected to step (c), is as stream (43) lowered in pressure in an expander (44) and so obtained gas stream (45) is mixed with the H$_2$-rich permeate (46), thereby obtaining a mixture (48) which is directed to a feed furnace (17) wherein it is heated and thereafter used as the reducing gas (18). The reducing gas (18) is contacted with the iron ore (20) in a DRI furnace (19) and the resulting iron is discharged via stream (21). The off-gas (22) of the DRI furnace (19) is directed to a CO$_2$ removal system (23) wherein CO$_2$ is separated thereby obtaining a second stream comprising CO$_2$ and H$_2$S (25) and a recycle reducing gas comprising CO and H$_2$ (35) which stream (35) is increased in pressure by passing through a compressor (35a). The recycle reducing gas comprising CO and H$_2$ (35) is recycled to the DRI furnace (19) via the feed furnace (17), by combining stream (35) with stream (48) to form stream (16). The second stream comprising CO$_2$ and H$_2$S (25) can optionally be directed to a sulphur removal unit (10) where it joins the first stream comprising CO$_2$ and H$_2$S (9) exiting the CO$_2$/H$_2$S removal system (8). Gas treatment can take place in separate systems (8) and (23), or it can take place in a combined system. The sulphur obtained in sulphur removal unit (10) is discharged via stream (11) while the CO$_2$ exits the sulphur removal unit (10) as stream (29). A part (30) of stream (29) can be directed to any other suitable process where CO$_2$ is used. Another part of the stream (29) is preferably used as carrier gas (2) for carrying the carbonaceous feed (1) to the gasifier (4). If the sulphur content of stream (25) is less than 10 ppmv, gas stream (25) may by-pass sulphur removal unit (10).

In case of failure of a coal gasification reactor (4), a steam methane reformer (49) can be used to obtain a stream (50) comprising H$_2$ and CO.

The present invention has been described in terms of preferred embodiments. It will be understood that modifications can be made thereto and that the scope of the invention is not limited by the foregoing specification.

What is claimed is:

1. A process to prepare elemental iron by contacting an iron ore feed with a reducing gas at a pressure of between 1 and 10 bar to obtain iron and an off-gas, including preparing the reducing gas by performing the following steps:
    (a) partially oxidizing a mixture comprising a solid or liquid carbonaceous fuel and oxygen at a pressure of between 10 and 80 bar, thereby obtaining a gas comprising CO$_2$, H$_2$S, H$_2$ and CO;
    (b) removing CO$_2$ and H$_2$S from the gas obtained in step (a) to obtain an intermediate gas comprising H$_2$ and CO;
    (c) supplying at least a portion of the intermediate gas obtained in step (b) to a H$_2$-selective membrane so as to obtain a H$_2$-rich permeate gas and a CO-rich retentate;
    (d) heating the H$_2$-rich permeate to obtain a heated H$_2$-rich permeate as the reducing gas.

2. The process according to claim 1, further including using the CO-rich retentate obtained in step (c) as a fuel in a gas turbine to generate power.

3. The process according to claim 1 wherein a part of the intermediate gas obtained in step (b) is not subjected to step (c) and is lowered in pressure and mixed with the H$_2$-rich permeate prior to heating the H$_2$-rich permeate in step (d).

4. The process according to claim 1 wherein the ratio of H$_2$ to CO in the reducing gas obtained in step (d) is between 0.9 and 2.

5. The process according to claim 1 wherein the heating in step (d) is performed in a furnace.

6. The process according to claim 1 wherein:
    CO$_2$ and H$_2$S are removed from the off-gas to obtain a recycle reducing gas comprising CO and H$_2$, and wherein
    the recycle reducing gas is mixed with the H$_2$-rich permeate prior to heating the H$_2$-rich permeate in step (d).

7. The process according to claim 1 wherein the carbonaceous fuel is chosen from the group consisting of solid carbonaceous fuels of coal, petroleum coke, or solid biomass, liquid carbonaceous fuels of residue oils, and combinations thereof.

8. The process according to claim 7 wherein the carbonaceous fuel is coal.

9. A method to retrofit an original system for preparing elemental iron, wherein the original system comprises at least one furnace for contacting an iron ore with a reducing gas and a steam methane reformer for preparing the reducing gas, wherein the steam methane reformer comprises a reactor having tubes filled with catalyst and a plurality of burners to heat the exterior of the tubes, comprising:
    adding to the system a coal gasification reactor, a membrane unit to obtain a H$_2$-rich permeate, and a feed furnace to increase the temperature of the H$_2$-rich permeate to obtain a heated H$_2$-rich permeate that is used the reducing gas,
    wherein the feed furnace is obtained by removing the catalyst from the tubes of the steam methane reforming reactor of the original system such that the H$_2$-rich permeate can flow through the tubes.

10. A process for preparing elemental iron, comprising contacting an iron ore feed with a reducing gas at a pressure of between 1 and 10 bar in a system constructed in accordance with the method of claim 9.

11. A process for preparing elemental iron, comprising
    a) providing an original system comprising at least one reaction furnace for contacting iron ore with a reducing gas and a steam methane reformer for preparing the reducing gas, wherein the steam methane reformer comprises a reactor having tubes filled with catalyst and a plurality of burners to heat the exterior of the tubes;
    b) removing the catalyst from the tubes of the steam methane reforming reactor of the original system so as to obtain a feed furnace;
    c) adding to the original system a coal gasification reactor and a membrane unit;
    d) operating the coal gasification reactor to produce an H$_2$-containing stream;
    e) contacting the H$_2$-containing stream with the membrane unit so as to obtain an H$_2$-rich permeate;
    f) using the feed furnace to increase the temperature of the H$_2$-rich permeate so as to obtain a heated H$_2$-rich permeate;
    e) using the heated H$_2$-rich permeate as the reducing gas in the reaction furnace.

12. The method according to claim 11 wherein step d) includes partially oxidizing a mixture comprising a solid or liquid carbonaceous fuel and oxygen at a pressure of between 10 and 80 bar, thereby obtaining a gas comprising H$_2$ and CO and removing CO$_2$ and H$_2$S from the gas so as to produce the H$_2$-containing stream; wherein step e) further produces a CO-rich retentate; and wherein step e) comprises by contacting an iron ore feed with the reducing gas at a pressure of between 1 and 10 bar to obtain iron and an off-gas.

13. The method according to claim 12, further including using the CO-rich retentate obtained in step e) as a fuel in a gas turbine to generate power.

14. The method according to claim 12, further including:
removing $CO_2$ and $H_2S$ from the off-gas to obtain a recycle reducing gas comprising CO and $H_2$, and wherein
mixing the recycle reducing gas with the $H_2$-rich permeate prior to step f).

15. The method according to claim 12, further comprising using a the $CO_2$ stream as carrier gas for carrying the carbonaceous fuel to the coal gasification reactor.

16. The method according to claim 12 wherein the carbonaceous fuel is chosen from the group consisting of solid carbonaceous fuels of coal, petroleum coke, or solid biomass, liquid carbonaceous fuels of residue oils, and combinations thereof.

17. The process according to claim 15 wherein the carbonaceous fuel is coal.

18. The method according to claim 11 wherein a part of the $H_2$-containing stream obtained in step d) is not subjected to step e) and is lowered in pressure and mixed with the $H_2$-rich permeate prior to heating the $H_2$-rich permeate in step f).

19. The method according to claim 11 wherein the ratio of $H_2$ to CO in the reducing gas obtained in step e) is between 0.9 and 2.

20. The method according to claim 11, further including the step of provising a a steam methane reformer that can be used as an alternative source for the $H_2$-containing stream.

* * * * *